United States Patent
Roach et al.

(10) Patent No.: US 10,159,883 B2
(45) Date of Patent: Dec. 25, 2018

(54) SPRING-FORM BANNER WITH CINCH STRAPS FOR MOUNTING TO POLES OF VARIABLE SIZE AND CROSS-SECTIONAL GEOMETRY

(71) Applicant: ScoreMore LLC, San Antonio, TX (US)

(72) Inventors: Grahm Collins Roach, San Antonio, TX (US); Chris Alan Carper, San Antonio, TX (US)

( * ) Notice: Subject to any disclaimer, the term of this patent is extended or adjusted under 35 U.S.C. 154(b) by 0 days.

(21) Appl. No.: 15/201,772

(22) Filed: Jul. 5, 2016

(65) Prior Publication Data

US 2017/0007898 A1    Jan. 12, 2017

Related U.S. Application Data

(60) Provisional application No. 62/188,736, filed on Jul. 6, 2015.

(51) Int. Cl.
*A63B 69/00* (2006.01)
*G09B 19/00* (2006.01)

(52) U.S. Cl.
CPC ........ *A63B 69/002* (2013.01); *A63B 69/0024* (2013.01); *G09B 19/0038* (2013.01); *A63B 2243/0025* (2013.01)

(58) Field of Classification Search
CPC ......... A63B 69/00; A63B 67/10; A45B 23/00; B60J 1/20
USPC ...................... 473/446; 482/148; 160/370.21
See application file for complete search history.

(56) References Cited

U.S. PATENT DOCUMENTS

| | | | | |
|---|---|---|---|---|
| 4,671,509 A | * | 6/1987 | Newman ................ | A63B 61/04 473/495 |
| 5,116,273 A | * | 5/1992 | Chan ..................... | A45B 23/00 160/370.21 |
| 5,992,045 A | * | 11/1999 | Kellogg ................. | F26B 25/18 160/370.21 |
| 6,192,635 B1 | * | 2/2001 | Zheng .................... | A63B 9/00 135/126 |
| 6,692,420 B2 | * | 2/2004 | Walden .................. | A63B 67/10 273/DIG. 19 |

* cited by examiner

*Primary Examiner* — Gene Kim
*Assistant Examiner* — Christopher Glenn
(74) *Attorney, Agent, or Firm* — Matthew M. Googe; Robinson IP Law, PLLC

(57) ABSTRACT

A goal training aid mountable to a pole for use as a target for goal training practice is provided. The goal training aid includes: a canvas target portion including an edge binding encompassing the canvas target portion, the edge binding including a flexible strip formed into a loop within the edge binding and joined together with a seizing band; a cinch loop attached to a front side of the canvas target portion by a cinch loop attachment strap; a strap adjustor attached to a rear side of the canvas target portion with a strap adjustor attachment strap; and a hook and loop cinch strap installed on the strap adjustor, the hook and loop cinch strap including a hook region and a loop region, both the hook region and loop region formed on a same side of the hook and loop cinch strap.

6 Claims, 2 Drawing Sheets

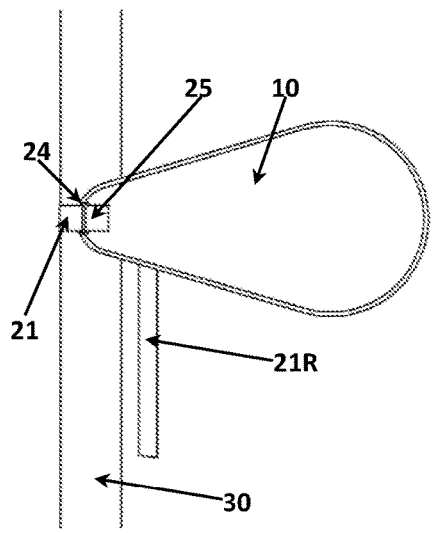
Fig. 3A
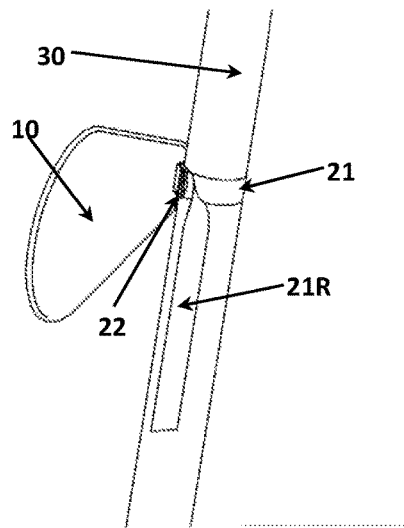
Fig. 3B
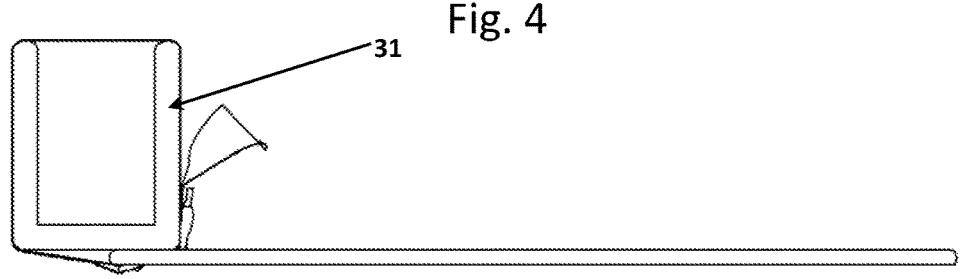
Fig. 4

SPRING-FORM BANNER WITH CINCH STRAPS FOR MOUNTING TO POLES OF VARIABLE SIZE AND CROSS-SECTIONAL GEOMETRY

CROSS-REFERENCE TO RELATED APPLICATION

This application claims priority to U.S. Patent Application Ser. No. 62/188,736 to Grahm Collins Roach and Chris Allen Carper for a Spring-Form Banner with Cinch Strap for Mounting to Poles of Variable Size and Cross-Sectional Geometry, which was filed on Jul. 6, 2015, the contents of which are incorporated herein by reference in its entirety.

FIELD

This disclosure relates to the field of athletic training aids. More particularly, this disclosure relates to a training device for aiding in goal scoring practice.

BACKGROUND

Attempts have been made to create practice targets for goal-oriented sports; some of which are currently on the market. However, all of these attempts have failed to achieve widespread market success due to various factors such as difficulty in mounting/dismounting devices, high costs of manufacturing the device, devices that are only capable of being used on a single size goal and are not adjustable, and the device disrupts normal use of a goal when installed.

For example, the most popular practice target currently on the market consists of hanging a sheet in front of the soccer goal with holes cut out of the corners or sides for target areas. This sheet is held taut by securing three sides to the goal posts and crossbar with straps (see patent US20080076606). Not only is this apparatus difficult to set up and take down, but it can only be used on a specific size goal, and restricts access to the goal while in place. Despite these drawbacks, this product has seen some market success and currently retails between $70-$390 per device.

What is needed, therefore, is a goal scoring practice device that provides a target for training and is also easily mounted and dismounted from any size soccer goal or other similar structure.

SUMMARY

The above and other needs are met by a goal scoring practice device that provides a target for training and is also easily mounted and dismounted from any size soccer goal or other similar structure. In a first aspect, a goal training aid mountable to a pole for use as a target for goal training practice is provided, the training aid including: a canvas target portion including an edge binding encompassing the canvas target portion, the edge binding including a flexible strip formed into a loop within the edge binding and joined together with a seizing band; a cinch loop attached to a front side of the canvas target portion by a cinch loop attachment strap; a strap adjustor attached to a rear side of the canvas target portion with a strap adjustor attachment strap; and a hook and loop cinch strap installed on the strap adjustor, the hook and loop cinch strap including a hook region and a loop region, both the hook region and loop region formed on a same side of the hook and loop cinch strap.

In one embodiment, the canvas target portion is substantially teardrop-shaped, and wherein the cinch loop and strap adjustor are positioned adjacent a narrow end of the canvas target portion.

In another embodiment, the strap adjustor comprises a ladder lock for receiving an end of the hook and loop cinch strap. In yet another embodiment, the canvas target portion further comprises a slot formed through the canvas target portion, and wherein the strap adjustor attachment strap and cinch loop attachment strap are connected through the slot formed in the canvas target portion.

In one embodiment, the goal training aid further includes one or more printed targets formed on the canvas target portion.

In a second aspect, a goal training aid mountable to a pole for use as a target for goal training practice is provided, the training aid including: a teardrop-shaped canvas target portion including an edge binding encompassing the canvas target portion, the edge binding including a flexible strip formed into a loop within the edge binding and joined together with a seizing band; a cinch loop attached to a front side of the canvas target portion at a narrow end of the canvas target portion by a cinch loop attachment strap; a cinch loop attached to a front side of the canvas target portion at a narrow end of the canvas target portion by a cinch loop attachment strap; a strap adjustor attached to a rear side of the canvas target portion at a narrow end of the canvas target portion with a strap adjustor attachment strap; and a cinch strap installed on the strap adjuster, the cinch strap including one or more releasable fasteners formed along a length of the cinch strap.

In one embodiment, the releasable fasteners of the cinch strap are formed of one or more buttons. In another embodiment, the releasable fasteners of the cinch strap are formed of omni-tape. In yet another embodiment, the goal training aid further includes one or more printed targets formed on the canvas target portion.

In a third aspect, a goal training aid mountable to a pole for use as a target for goal training practice is provided, the training aid including: a canvas target portion including an edge binding encompassing the canvas target portion, the edge binding including a flexible strip formed into a loop within the edge binding and joined together with a seizing band; one or more printed targets formed on the canvas target portion; a cinch loop attached to a front side of the canvas target portion by a cinch loop attachment strap; a strap adjustor attached to a rear side of the canvas target portion with a strap adjustor attachment strap; and a hook and loop cinch strap installed on the strap adjustor, the hook and loop cinch strap including a hook region and a loop region, both the hook region and loop region formed on a same side of the hook and loop cinch strap.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 3A and 3B show views of a spring form banner mounted to a circular pole according to one embodiment of the present disclosure; and FIG. 4 shows a top view of a spring form banner mounted on circular and non-circular poles according to embodiments of the present disclosure.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A spring-form banner is provided including an attached cinch strap for mounting to poles of variable size and cross-sectional geometry to assist in soccer goal shooting practice. The spring-form banner provides a target that can be easily mounted and dismounted from any size soccer goal. Although the spring-form banner was originally conceived to aid in soccer goal shooting practice, it can also be used for many other applications, such as other goal-oriented sports (e.g., hockey), signage/advertisement, warning signs, general notifications, photography/videography, etc.

The target area for this device consists of a fabric canvas with a hemmed perimeter. A flexible strip (typically spring steel) is inserted in the hem and connected at the ends to form a spring loop. This construction holds the canvas open and taut creating a spring-form banner. The spring-form banner can be easily deformed but will spring back to its original shape once all external forces have been removed. An adjustable length hook-and-loop (Velcro) cinch strap is mounted on the canvas and is used to secure the spring-form banner against the pole, allowing this device to fit on virtually any size and/or geometry pole. It should be noted that the spring-form banner is similar in construction, but not geometry, to the device described in U.S. Pat. No. 5,024,262 entitled "Compactly Foldable Automobile Sunshade," patent date Jun. 18, 1991.

Figure 1:
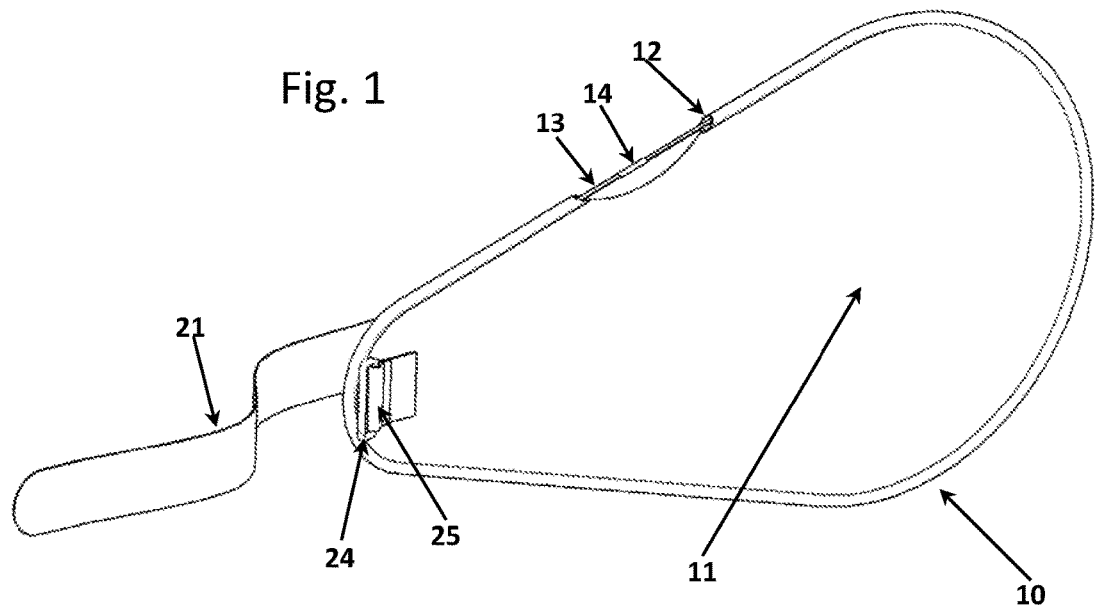
FIG. 1 shows a front isometric view of an un-mounted spring form banner according to one embodiment of the present disclosure.
Figure 2:
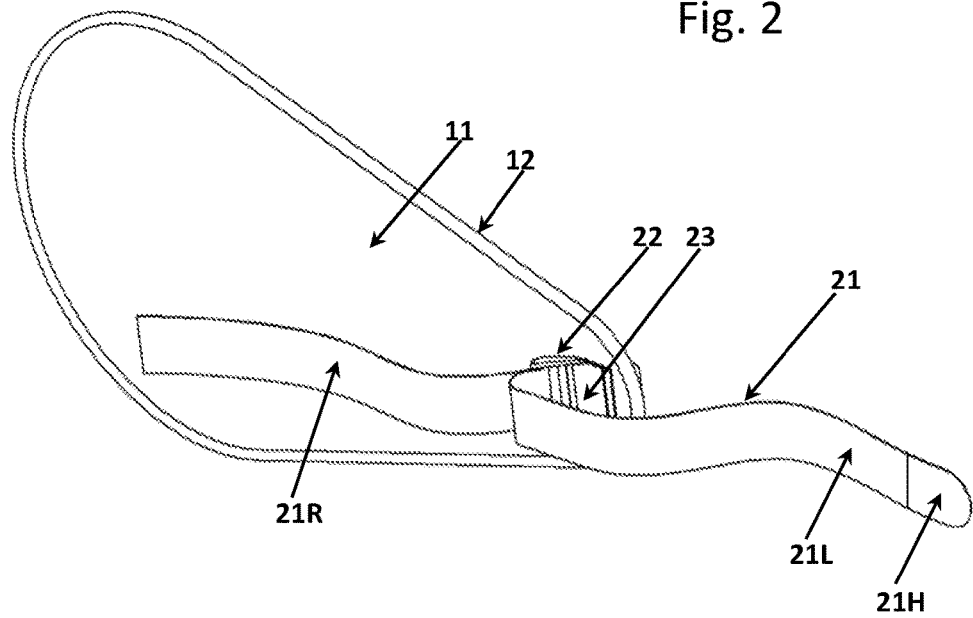
FIG. 2 shows a rear isometric view of an un-mounted spring form banner according to one embodiment of the present disclosure.

Referring to FIGS. 1 and 2, the device includes a spring-form banner 10 that is substantially flat and non-concave in shape. The banner 10 includes a canvas portion 11 encompassed by an edge binding/hem 12. Within the edge binding/hem 12 is a resiliently flexible strip 13. The strip 13 may be formed of a tubular polymer material or, alternatively, may be formed of an elongate spring steel strip. Ends of the strip 13 are joined together with a seizing band 14.

While FIGS. 1 and 2 illustrate the spring-form banner 10 and canvas portion 11 as being substantially flat and teardrop-shaped, it is also understood that the banner 10 and canvas portion 11 may be formed into a variety of other suitable shapes for goal training. For example, the spring-form banner 10 may be non-concave, concave, or convex in shape, or may be formed into various alternative three-dimensional shapes suitable for targeting in a soccer goal.

A cinch loop 24 is attached to a front side of the canvas by a cinch loop attachment strap 25. A strap adjustor 22 is attached to a rear side of the canvas with a strap adjustor attachment strap 23. A hook and loop cinch strap 21 has a hook region 21H and a loop region 21L formed on the same side of the hook and loop cinch strap 21. The cinch strap 21 is installed in the strap adjustor 22, which governs a useable length of the cinch strap 21. A residual length of the cinch strap 21R hangs freely from the strap adjustor 22, as shown in FIGS. 3A and 3B.

To mount the target to a pole 30 and 31 (FIG. 4), the target is placed against the pole in the desired location. Pass the cinch strap 21 around the pole 30 and through the cinch loop 24. Ensure that the cinch strap hook region 21H is sticking through the cinch loop, and the cinch strap loop region 21L is wrapped around the pole 30 facing outward. Pull the cinch strap 21 back against the cinch loop 24 to cinch the cinch strap 21 against the pole 30. If the effective length of the cinch strap 21 is either too long or too short, the cinch strap 21 can be adjusted to the appropriate length by sliding the cinch strap 21 through the strap adjustor 22 before cinching against the pole 30. Target can be mounted to a pole 30 with any cross-sectional geometry (e.g., circular pole 30 or U-channel pole 31), provided the cinch strap 21 is long enough.

Once mounted, the canvas 11 acts as a target region for soccer shooting practice. If struck, the spring-form banner 10 (comprised of the canvas 11, edge binding/hem 12, spring loop 13, and seizing band 14), will deflect out of the path of the ball and will spring back to its original shape and position.

To dismount, simply pull the hook region 21H of the cinch strap 21 off the loop region 21L, pull the cinch strap 21 back through the cinch loop 24, and remove from the pole 30.

In alternative embodiments, Omni-tape or snag-free Velcro straps may be utilized in place of a hook and loop material for the cinch strap and strap adjustor. The canvas portion may be formed into various sizes and geometric shapes. Further, the canvas may include one or more printed targets featured on the canvas portion for targeting by a user. The canvas may also be formed of a semi-rigid plastic sheet.

In one embodiment, two or more adjustable length cinch straps (or omni-tape straps) may be secured to the canvas portion such that the additional cinch straps are parallel, perpendicular, or otherwise oriented in an angled relationship to a first cinch strap. The cinch straps may be attached to the edge binding instead of the canvas.

The cinch loop 24 may be alternatively formed of a D-ring, tri-glide, ratchet, cam/spring buckle, cinch buckle, military and tongue-style belt buckles, and other suitable mechanisms for securing the cinch strap.

In another embodiment, webbing including an adjustable side-release buckle, a ratchet mechanism, or snap buttons may be used in place of adjustable length hook and loop cinch straps. Webbing straps may be attached to a rear side of the canvas portion and a hook and loop strap secured to a front side of the canvas portion. A strap adjustor may be installed on the webbing strap and slidably adjusted to govern a length of the strap.

When the spring-form banner 10 is installed on a soccer goal, a user may kick a soccer ball towards the banner 10 as targeting practice for the user. When the banner 10 is struck by a soccer ball, the banner 10 deflects to indicate that the banner 10 has been struck before returning to its original position.

The spring-form banner of the present disclosure advantageously provides a scoring target that is:

Easy to mount or dismount for a goal;
Low cost;
Configurable for use with any size goal;
Easily configured to allow for a single or several target areas for a goal;
Allows a target area to be adjustably placed around a goal;

Allows for normal use of and access to a goal when installed.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A goal training aid mountable to a pole for use as a target for goal training practice, the training aid comprising:
    a teardrop-shaped deformable canvas target portion having a first proximal end adjacent the pole and a second distal end, the target portion tapering in width from a narrow portion at the first proximal end to a wider portion at the second distal end, the target portion further including an edge binding encompassing the canvas target portion, the edge binding including a flexible strip formed into a loop within the edge binding and joined together with a seizing band;
    a cinch loop attached to a front side of the canvas target portion at the first proximal end of the canvas target portion by a cinch loop attachment strap;
    a strap adjustor attached to a rear side of the canvas target portion at the first proximal end of the canvas target portion with a strap adjustor attachment strap, the strap adjustor aligned with the cinch loop attached to the front side of the canvas target portion; and
    a hook and loop cinch strap installed on the strap adjustor, the hook and loop cinch strap including a hook region and a loop region, both the hook region and loop region formed on a same side of the hook and loop cinch strap;
    wherein the strap adjustor engages the cinch loop to secure the proximal first end of the deformable canvas target portion to the pole such that the deformable canvas target portion extends perpendicular to the pole and the wider second distal end of the canvas target portion is distal from the pole; and
    wherein the wider distal second end of the teardrop-shaped target portion located distally from the pole and is capable of deflecting relative to the pole.

2. The goal training aid of claim 1, wherein the cinch loop and strap adjustor are positioned adjacent the narrow first proximal end of the teardrop-shaped canvas target portion.

3. A goal training aid mountable to a pole for use as a target for goal training practice, the training aid comprising:
    a teardrop-shaped deformable canvas target portion having a first proximal end adjacent the pole and a second distal end, the target portion tapering in width from a narrow portion at the first proximal end to a wider portion at the second distal end, the target portion further including an edge binding encompassing the canvas target portion, the edge binding including a flexible strip formed into a loop within the edge binding and joined together with a seizing band;
    a cinch loop attached to a front side of the canvas target portion at the first proximal end of the canvas target portion by a cinch loop attachment strap;
    a cinch loop attached to a front side of the canvas target portion at the narrow proximal first end of the canvas target portion adjacent an edge of the canvas target portion by a cinch loop attachment strap;
    a strap adjustor attached to a rear side of the canvas target portion at the narrow proximal first end of the canvas target portion with a strap adjustor attachment strap, the strap adjustor aligned with the cinch loop attached to the front side of the canvas target portion; and
    a cinch strap installed on the strap adjuster, the cinch strap including one or more releasable fasteners formed along a length of the cinch strap;
    wherein the strap adjustor engages the cinch loop to secure the proximal first end of the deformable canvas target portion to the pole such that the deformable canvas target portion extends perpendicular to the pole and the wider second distal end of the canvas target portion is distal from the pole.

4. The goal training aid of claim 3, wherein the releasable fasteners of the cinch strap are formed of omni-tape.

5. The goal training aid of claim 3, further comprising one or more printed targets formed on the canvas target portion.

6. A goal training aid mountable to a pole for use as a target for goal training practice, the training aid comprising:
    a teardrop-shaped deformable canvas target portion having a first proximal end adjacent the pole and a second distal end, the target portion tapering in width from a narrow portion at the first proximal end to a wider portion at the second distal end, the target portion further including an edge binding encompassing the canvas target portion, the edge binding including a flexible strip formed into a loop within the edge binding and joined together with a seizing band;
    one or more printed targets formed on the canvas target portion;
    a cinch loop attached to a front side of the canvas target portion at the first proximal end of the canvas target portion by a cinch loop attachment strap;
    a strap adjustor attached to a rear side of the canvas target portion at the first proximal end with a strap adjustor attachment strap, the strap adjustor aligned with the cinch loop attached to the front side of the canvas target portion; and
    a hook and loop cinch strap installed on the strap adjustor, the hook and loop cinch strap including a hook region and a loop region, both the hook region and loop region formed on a same side of the hook and loop cinch strap;
    wherein the strap adjustor engages the cinch loop to secure the proximal first end of the deformable canvas target portion to the pole such that the deformable canvas target portion extends perpendicular to the pole and the wider second distal end of the canvas target portion is distal from the pole.

\* \* \* \* \*